United States Patent [19]

Fry

[11] Patent Number: 4,480,298
[45] Date of Patent: Oct. 30, 1984

[54] MULTIPLE OUTPUT DC-TO-DC VOLTAGE CONVERTER APPARATUS

[75] Inventor: Warren C. Fry, Pittsburgh, Pa.

[73] Assignee: Westinghouse Electric Corp., Pittsburgh, Pa.

[21] Appl. No.: 461,042

[22] Filed: Jan. 25, 1983

[51] Int. Cl.³ .......................................... H02M 3/315
[52] U.S. Cl. ...................................... 363/28; 307/11; 307/31; 363/85; 363/128
[58] Field of Search ....................... 307/11, 12, 31, 33; 363/27, 28, 37, 41, 84–86, 67, 96, 126, 128, 135

[56] References Cited

U.S. PATENT DOCUMENTS

| | | | |
|---|---|---|---|
| 3,855,518 | 12/1974 | Genuit | 363/28 |
| 4,106,087 | 8/1978 | Kawasaki | 363/128 X |
| 4,164,016 | 8/1979 | Schuchard | 363/128 X |
| 4,241,395 | 12/1980 | Stacey et al. | 363/39 |
| 4,322,817 | 3/1982 | Kuster | 363/85 X |
| 4,326,154 | 4/1982 | Lewis et al. | 318/376 |

OTHER PUBLICATIONS

"Alternative Systems for Rapid Transit Propulsion and Electrical Braking", B. J. Krings, *Westinghouse Engineer*, Mar. 1973, pp. 34–41.

*Primary Examiner*—William M. Shoop
*Attorney, Agent, or Firm*—R. G. Brodahl

[57] ABSTRACT

A voltage converter apparatus is provided to energize a first load and a second load from a power supply connected through an inverter and a coupling transformer, with the transformer having a first secondary winding energizing the first load with first voltage pulses having a variable width determined by the operational frequency of the inverter and having a second secondary winding energizing the second load with second voltage pulses having a variable width determined by a phase controlled switching apparatus responsive to one of the voltage and the current of the second voltage pulses.

7 Claims, 12 Drawing Figures

MULTIPLE OUTPUT DC-TO-DC VOLTAGE CONVERTER APPARATUS

BACKGROUND OF THE INVENTION

A typical electrical trolley bus vehicle includes propulsion equipment and auxiliary load devices that draw current from a power source trolley wire through pickup devices carried by the vehicle. The auxiliary load devices can include load voltage equipment such as the lights, blowers, air conditioners, heaters, and so forth of the trolley bus.

It is known to provide a DC-to-DC voltage converter for a trolley bus operation which is coupled with the input DC trolley wire energized by a well known power supply that nominally is 600 volts DC but can vary from 300 volts DC to 800 volts DC. THe DC-to-DC voltage converter apparatus can provide a regulated DC output determined by controlling the ON and OFF ratio of operation of a thyristor inverter circuit on the primary of a transformer with the secondary of that transformer being coupled to the output load through a full wave rectifier and a filter circuit. If two separate and independent regulated power supplies are provided to supply current to the propulsion equipment and to the auxiliary load devices, this involves considerable expense and requires additional space on the trolley bus.

SUMMARY OF THE INVENTION

A DC-to-DC voltage converter apparatus includes a first voltage supply apparatus providing a regulated DC output controlled by changing the on to off ratio of an inverter operative with the primary of a coupling transformer which has a first secondary winding connected with a first rectifier and a first filter to provide a first output voltage that is fed back to control the frequency inverter for regulating the first output voltage. A second voltage supply apparatus is operative with the coupling transformer and includes a second secondary winding connected with a thyristor second rectifier and a second filter to provide a second output voltage in accordance with the operation of a phase controller connected with the thyristor second rectifier to regulate a second output voltage independent of the regulation of the first output voltage. The first output voltage is pulse width modulated and the second output voltage is a pulse width modulation of the pulse width modulated first output voltage.

DESCRIPTION OF THE PREFERRED EMBODIMENT

Figure 1:
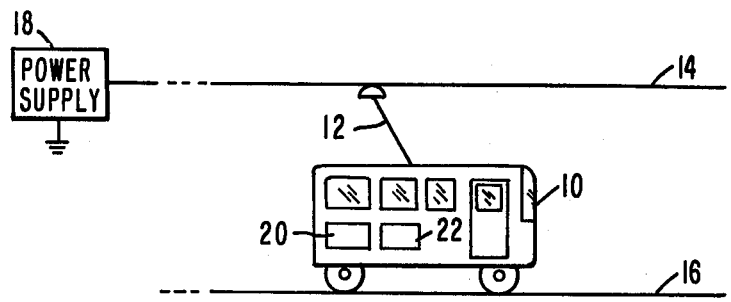
FIG. 1 illustrates a prior art trolley bus energized by a suitable power supply.

In FIG. 1 there is shown a prior art trolley 10 coupled through a trolley pole 12 with a trolley wire 14 which extends along the desired travel path 16 of the trolley bus 10. A suitable DC power supply 18 is connected with the trolley wire 14 to provide power to the propulsion motor apparatus 20 and the auxiliary load devices 22 of the trolley bus.

Figure 2:
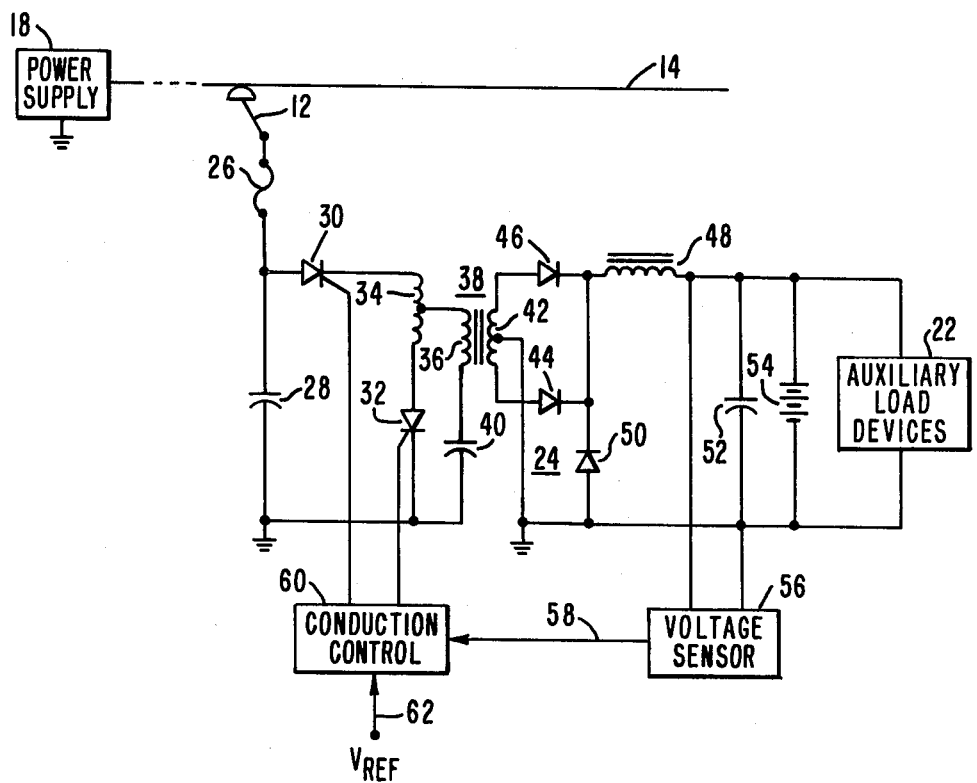
FIG. 2 schematically shows a prior art DC-to-DC voltage converter apparatus that has been previously used to supply power to the low voltage auxiliary load devices of a trolley bus.

In FIG. 2 there is shown a prior art DC-to-DC voltage converter apparatus for providing a regulated low voltage DC output to the auxiliary load devices of a trolley bus. A well known DC power supply 18 energizes a trolley wire 14 which extends parallel to the intended travel route of a trolley bus. The trolley pole 12 is coupled between the trolley wire 14 and a regulated voltage supply apparatus 24 carried by the trolley bus. A fuse 26 and a filter capacitor 28 are coupled through thyristor devices 30 and 32 and a center tapped inductor 34 to the primary winding 36 of a transformer 38, which primary winding is connected in series with a charging capacitor 40. The secondary winding 42 of transformer 38 is connected through full wave rectifier diodes 44 and 46 to energize the auxiliary load device 22. A line reactor 48 and a freewheeling diode 50 for the inductive current operate with a filter capacitor 52 to smooth the variations in the output DC voltage from the full wave rectifier diodes 44 and 46. A battery 54 is connected to supply standby voltage such as 12 volts to the auxiliary load devices 22. A voltage sensor 56 is connected to sense the voltage across the capacitor 52 and provides a voltage feedback signal 58 to one input of the conduction control 60. A desired reference voltage 62 is provided to a second input of the conduction control 60 for establishing the frequency of the ON and OFF conduction of the thyristor devices 30 and 32 in accordance with the difference error between the desired reference voltage 62 and the feedback actual output voltage 58 of the voltage supply apparatus 24. The thyristor 30 is fired ON to conduct current in one direction through the primary winding 36 to charge the capacitor 40, and when the capacitor 40 is charged this current flow stops. Then the thyristor 32 is fired ON to conduct current in the opposite direction through the primary winding 36 to discharge the capacitor 40. The ON conduction time of each thyristor is determined by the circuit components and the OFF time between adjacent conduction periods is controlled to regulate the actual output voltage. This provides an AC signal through the transformer 38, having a voltage magnitude determined by the respective ON and OFF conduction frequency relationships of the thyristors 30 and 32, with an energy transfer of $\frac{1}{2}CV^2$ provided for each such conduction. The desired reference voltage 62 could be 14 volts when an output charging voltage of 14 volts is desired across the 12 volt battery 54 and to supply power to the auxiliary load devices 22.

Figure 3:
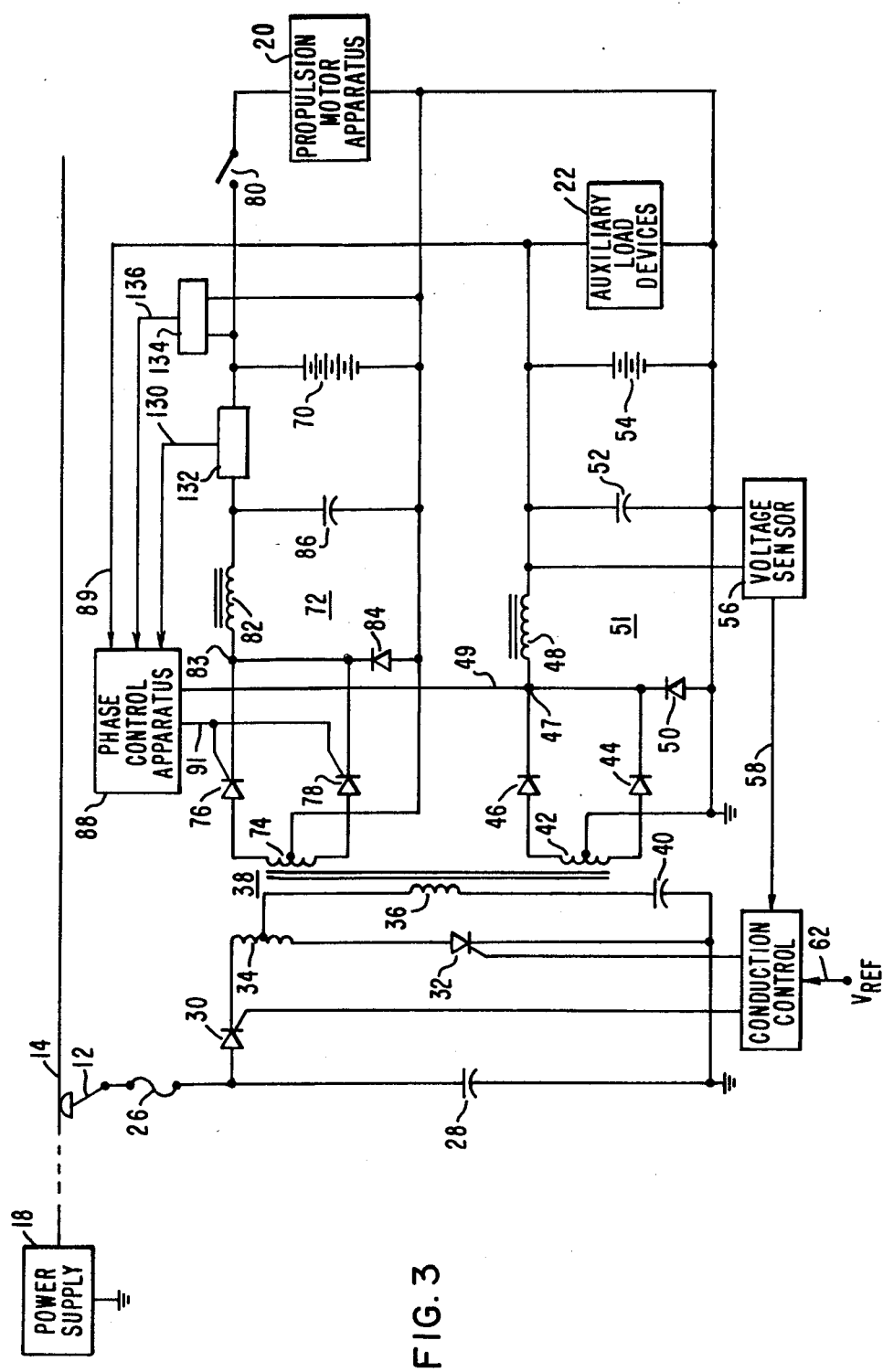
FIG. 3 schematically shows the improved DC-to-DC voltage converter apparatus of the present invention.

In FIG. 3 there is shown the improved voltage converter apparatus of the present invention to provide a first regulated output voltage and a second regulated output voltage to respective loads of a trolley bus. The components that are common with those shown in FIG. 2 are indicated with the same reference numerals in FIG. 3. It is desired to have a battery powered mode of trolley bus propulsion to move around obstacles in the travel path that require decoupling of the trolley bus from the trolley wire or if for some reason a section of the trolley wire is not energized. For this purpose, a propulsion first voltage supply battery 54 is provided to energize the auxiliary load devices 22 and a voltage supply battery 70 is connected to energize the propulsion motor apparatus 20 of the trolley bus when the trolley pole 12 is not energized by the trolley wire 14. A phase controlled second voltage supply apparatus 72 that can have a higher output voltage is provided to keep the battery 70 charged and includes an additional secondary winding 74 for the transformer 38. The winding 74 has a number of turns in accordance with the desired output voltage. For example, to provide an output voltage of 84 volts to charge the battery 70 would require the winding 74 to have a 6:1 turns ratio in relation to the winding 42 that provides an output voltage of 14 volts to charge the battery 54. The secondary winding 74 is connected through rectifying thyristors 76 and 78 to charge the battery 70. It should be recognized that during normal operation of the trolley bus 10, with the trolley pole 12 in contact with the trolley wire 14, the propulsion motor apparatus includes an independent propulsion control apparatus not shown, such as a chopper device operating in accordance with the description in an article entitled "Alternate Systems for Rapid Transit Propulsion and Electrical Braking" that was published in the Westinghouse Engineer for March, 1973 at pages 34 to 41. The second voltage supply apparatus 72 is operative during the above normal operation to maintain the propulsion battery 70 in a charged state. When the trolley pole 12 is disconnected from the trolley wire 14, or when the trolley wire 14 is not energized by the power supply 18, then the battery 70 is available to energize the propulsion motor control apparatus 20. The switch 80 can be closed by the operator to permit the battery 70 to energize the propulsion motor apparatus 20. The line reactor 82 and the freewheeling diode 84 for inductive current operate with the filter capacitor 86 to smooth the variations in the output DC voltage from the thyristor rectifiers 76 and 78.

The inverter including the thyristors 30 and 32 is responsive to the charging current load of the battery 70 through operation of the transformer 38. The energy supplied to the second secondary winding 74 influences the energy supplied to the first secondary winding 42 and results in increasing the frequency of the ON operations of the thyristors 30 and 32. As energy is removed by the winding 74, an increase in the frequency of the ON operations of the thyristors 30 and 32 is required to satisfy the load requirements for the winding 42 and the winding 74.

Figure 4:
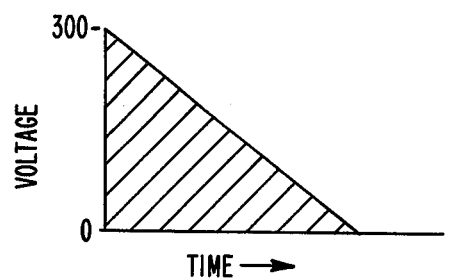
FIG. 4 illustrates the current waveform through the transformer primary winding from each of the input thyristors when they are conductive to provide the maximum current through that primary winding.
Figure 5:
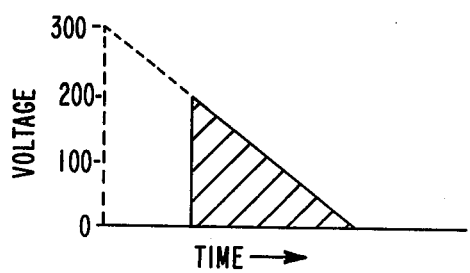
FIG. 5 illustrates the current waveform through the primary winding from each of the input thyristors when the thyristors are phased back to conduct and provide less than the maximum current through the primary winding.

Due to operation of the choke 82, if an actual output voltage of 84 volts is desired across the battery 70, then a peak voltage of about twice that voltage is required at terminal 83 to have the desired capability for increasing current in a continuous freewheeling mode of operation. If the entire waveform available from the winding 74 is desired for application to the choke 82, then each one of the thyristors 76 and 78 is fired ON all the time and a peak voltage of about 300 volts is available, as shown in FIG. 4. If this ON conduction is phased back, as shown in FIG. 5, a peak voltage of about 200 volts is applied to the choke 82. The ON conduction phase relationship of the thyristors 76 and 78 can be controlled by the phase control apparatus 88 as required to establish the desired charging voltage for the battery 70.

Figure 7:
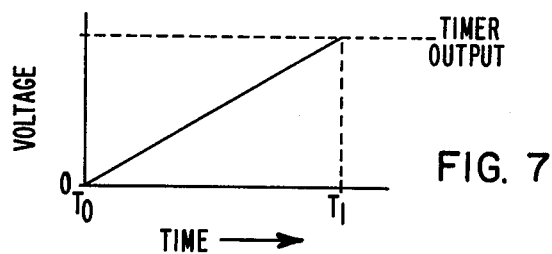
FIG. 7 illustrates the output voltage of the upper voltage apparatus control thyristors when no feedback current signal and no voltage feedback signal are provided to the phase control apparatus.
Figure 8:
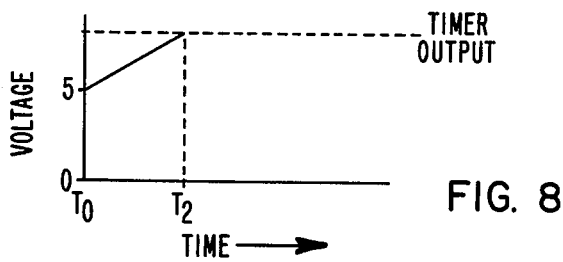
FIG. 8 illustrates the output voltage of the upper voltage apparatus thyristors when one of the feedback current signals or the feedback voltage signals is limiting the phase operation of those thyristors.
Figure 6:
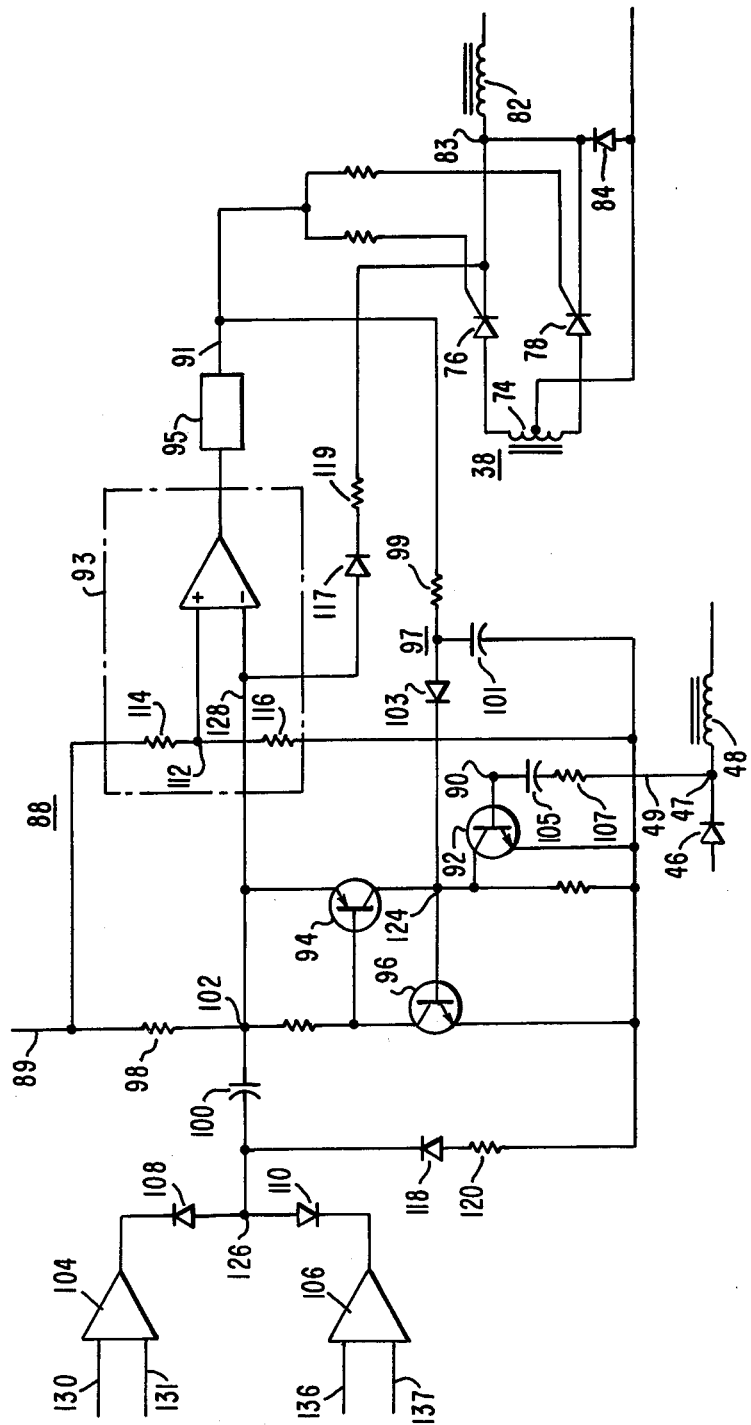
FIG. 6 schematically shows the phase control apparatus of FIG. 3.

In FIG. 6 there is schematically shown the phase control apparatus 88. A ramp start signal is applied to input 90 to cause transistor 92 to conduct and the transistors 94 and 96 to switch off, causing the current through the resistor 98 to flow through the capacitor 100. The voltage of terminal 102 will immediately jump to the lowest voltage of the operational amplifiers 104 or 106 as auctioneered by the diodes 108 and 110. This initial step voltage will then be followed by an RC ramp that establishes the amount of time for the phase shift as determined by resistor 98 and capacitor 100. If the initial step voltage at terminal 102 is equal to or greater than the voltage reference at terminal 112 of the voltage divider including resistors 114 and 116, the time delay provided by the phase controller apparatus 88 is zero. If the initial step voltage at 102 is less than the divider voltage at terminal 112, then the ramp slope plus the step voltage determines the time delay. The diode 118 is a reset path current limited by the resistor 120 and initiated when transistor 96 receives a reset signal from the comparator circuit 93. The comparator circuit 93 can comprise an Intel 555 comparator available at the present time from the Itel Corporation, Santa Clara, Calif. 95051. The comparator circuit 93 operates through an inverting output amplifier 95, such that a positive output pulse signal 91 is provided to the timer 97 and fixes ON the thyristors 76 and 78. The timer 97 includes a resistor 99 and a capacitor 101 which integrates the pulse signal 91 and when it reaches about 0.6 volt plus the voltage drop of about 0.6 volt for the diode 103 the transistor 92 turns ON the switch transistors 94 and 96 to reset the comparator 93. The positive reset signal applied by the timer 97 at terminal 124 has about a 50 microsecond time duration and turns ON the transistor 96 to reset the terminal 102 to zero to provide the desired pulse width. After the reset signal at terminal 124 ends, the ramp start signal at input 90 initiates the RC ramp buildup as shown in FIG. 7 at time $T_0$ when the terminal 126 is at zero volts. In other words, when the lowest of the output voltages of the operational amplifiers at terminal 126 is zero, then the voltage at terminal 102 is also zero and the ramp shown in FIG. 7 will start at zero volts at time $T_O$. The comparator 93 operates such that when the voltage applied at input 128 reaches two-thirds of the reference voltage 89, which is a regulated power supply voltage of 12 volts and for convenience is taken as the regulated output voltage from the first voltage supply apparatus 24, the output reset signal 91 is applied through timer 7 as a 50 microsecond signal to terminal 124 to turn ON the thyristors 76 and 78. If it is desired to control the firing time of the thyristors 76 and 78 sooner to provide a longer on time, the lowest of the output voltages at terminal 126 can be utilized for this purpose. The operational amplifier 106 output voltage can be employed to regulate the output voltage in accordance with the desired voltage across the battery 70. For example, if the output voltage of the amplifier 106 is the lowest and is raised to 5 volts, then the terminal 102 starts at 5 volts as shown in FIG. 8 and the same RC charging rate provides the reset output 91 from the comparator circuit 93 at time $T_2$ to shorten the conductivity period of the thyristors 76 and 78 to lower the actual voltage across the battery 70. If the lowest voltage at a terminal 126 is made 10 volts, this is above two-thirds of the reference 12 volts at input 89 so the reset pulse is provided at time $T_O$. The time $T_O$ is determined by the initiation signal at input 90 which starts the integration of the RC circuit including resistor 98 and the capacitor 100, which signal is obtained from terminal 47. This initiation signal is coupled to the base of transistor 92 and when it goes positive, it removes the base drive from transistor 92 to shut OFF the transistors 94 and 96 to result in current flow through the RC circuit including resistor 98 and capacitor 100. The voltage at terminal 102 immediately jumps to the lowest output voltage of the two operational amplifiers 104 and 106, as shown in FIGS. 7 and 8. The signal at connection 47 shown in FIG. 3 is differentiated by resistor 107 and capacitor 105 and applied to transistor 92 to reset the switch pair 94 and 96 to start the signal integration at time $T_O$ shown in FIGS. 7 and 8. When the integrated signal at 102 goes above the reference voltage at terminal 112 an output signal is provided by the comparator circuit 93 to reset the switch pair 94 and 96 to be conductive and stop the integration cycle. The output signal from the comparator circuit 93 fires both thyristors 76 and 78 such that whichever thyristor is operative with a positive voltage waveform from the secondary winding 74 will begin to conduct current to the load 70. The time duration of this load current is determined by the timer 7.

The operational amplifier 104 can be provided with a current regulation feedback signal 130 from a current sensing device 132 for providing a current limit function in relation to a desired current reference signal and to determine the operation of the phase control apparatus 88. For example, if it is desired to limit the charging current to the battery 70 to no more than 20 amperes, this can be provided by determining the output voltage from the operational amplifier to a value that would establish such a current limit. The voltage sensing device 134 can supply a voltage regulation feedback signal 136 to the operational amplifier 106 in relation to a desired voltage signal 137 to control the output voltage fo the operational amplifier 106 to determine the actual voltage applied across the battery 70 by the voltage supply apparatus 72 to be in the order of 84 volts. The lowest of these operational amplifier output voltages as provided to terminal 126 will establish the operation of the phase control apparatus 88.

The battery 70 can be a 200 ampere hour battery that can be fully charged in about 10 hours at a current limit of 20 amperes. A typical trolley bus operative with such a battery would normally pull about 10% of battery capacity to travel a few hundred yards on battery power around an obstacle. In about an hour of regular operation, the battery should again become fully charged and should remain fully charged until the next requirement for battery powered operation of the trolley bus.

In the operation of a trolley bus, the auxiliary load devices 22 should at all times require some base load current which will assure that there is some voltage feedback signal 58 that will stay below the reference 62 and require some output current from the thyristors 30 and 32 through the two secondary windings 42 and 74. This energization of the winding 74 maintains the operation of the second voltage supply apparatus 72 with the phase control apparatus establishing a desired voltage regulation and/or current limit operation in relation to charging the battery 70.

When the battery 70 becomes overcharged and the phase control apparatus operates to phase back the operation of the second voltage supply apparatus 72, if the thyristors 76 and 78 have not been fired ON by the end of the present cycle as determined by the last ramp start signal at input 90 it might be desired to include the diode 117 and the resistor 119 to prevent the firing ON of one of the thyristors 76 and 78 until the beginning of the next cycle and after another ramp start signal is provided at input 90.

Figure 9:
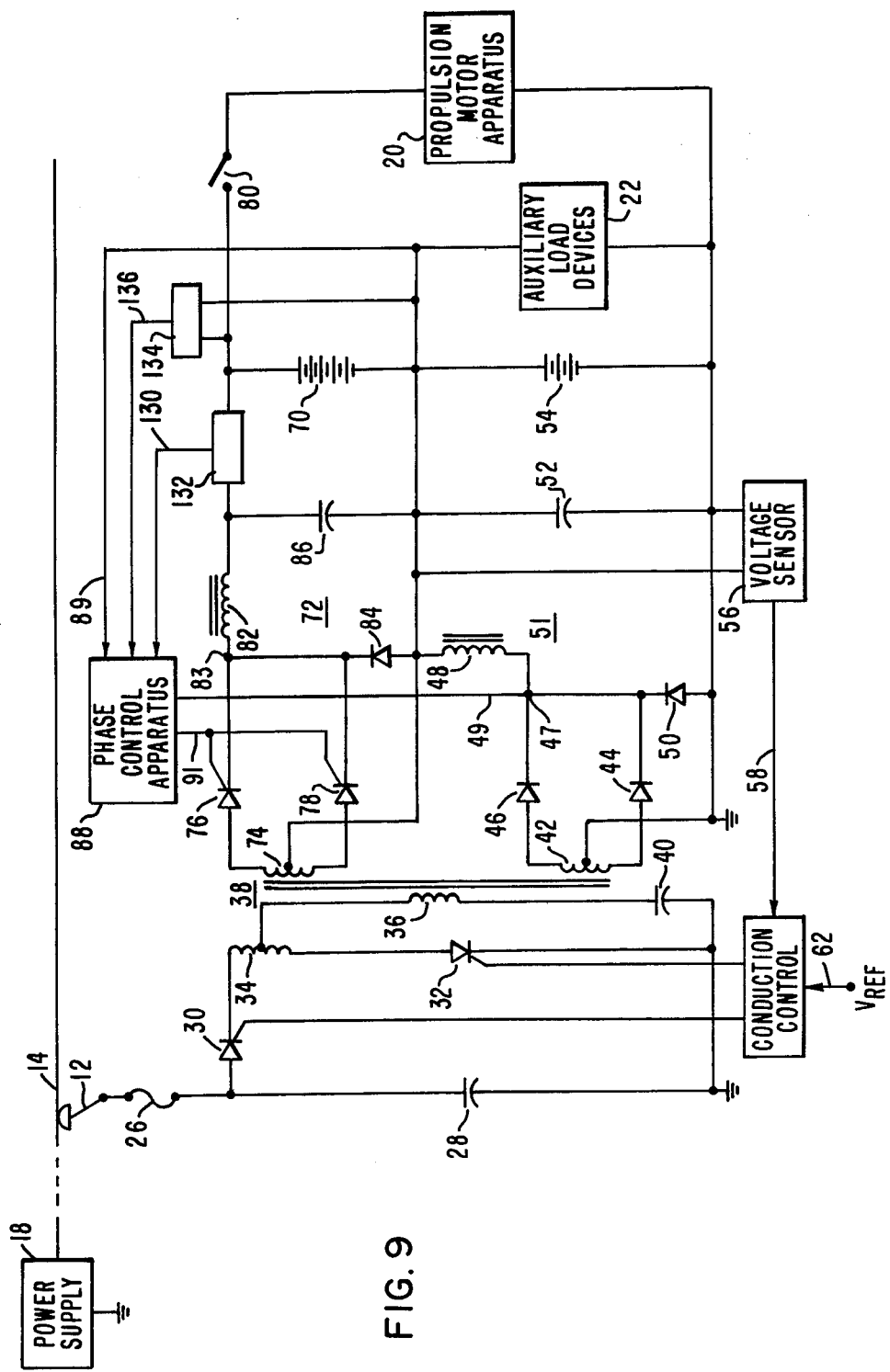
FIG. 9 shows a modification of the present voltage converter apparatus.

In FIG. 9 there is shown a modification of the present voltage converter apparatus. All of the components shown in FIG. 9 that are common with the components shown in FIG. 3 are indicated with the same reference numbers. In FIG. 9 the batteries 54 and 70 are connected in series to energize the propulsion motor apparatus 20 as desired when the switch 80 is closed by the operator. However, if the lower battery 54 is fully charged by the first voltage supply apparatus 24, it is not desired to charge the two batteries 54 and 70 together with a common series current. If the lower battery is fully charged and there is a current flowing to the auxiliary load devices 22 of, for example, 20 amperes, the upper battery can be charged at this time by the phase control apparatus 88 firing ON the thyristors 76 and 78 in accordance with the showing of FIGS. 7 and 8 and as determined by the feedback voltage signal 136 and the feedback current signal 130. The current flow through the battery 70 does not flow through a fully charged battery 54 but rather it flows through the auxiliary load devices 22. The voltage across the battery 54 will not go above 14 volts due to the operation of the voltage feedback signal 58 and the voltage reference signal 62 with the conduction control 60. If there is no path through the auxiliary load devices 22 for the charging current through the battery 70, then to prevent the actual voltage seen by the voltage sensor 56 from going above the 14 volts reference 62, the thyristors 30 and 32 will stop the AC current in the primary winding 36.

With the series battery arrangement of FIG. 9, the desired output voltage of 84 volts across the propulsion motor apparatus 20 is obtained with the upper battery 70 providing 72 volts and the lower battery 54 providing 12 volts of energy to the propulsion motor apparatus 20. For this purpose a suitable turns ratio relationship between the secondary windings 42 and 74 is provided.

Figure 10:
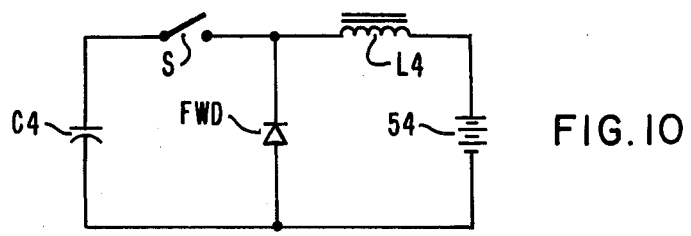
FIG. 10 shows an equivalent circuit of a capacitor and an inductor feeding into a battery.
Figure 11:
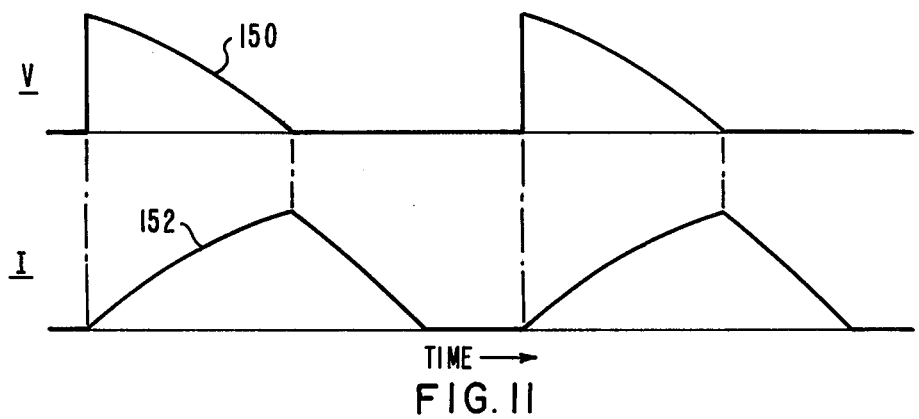
FIG. 11 illustrates a light load waveform in relation to the operation of the first voltage supply apparatus.
Figure 12:
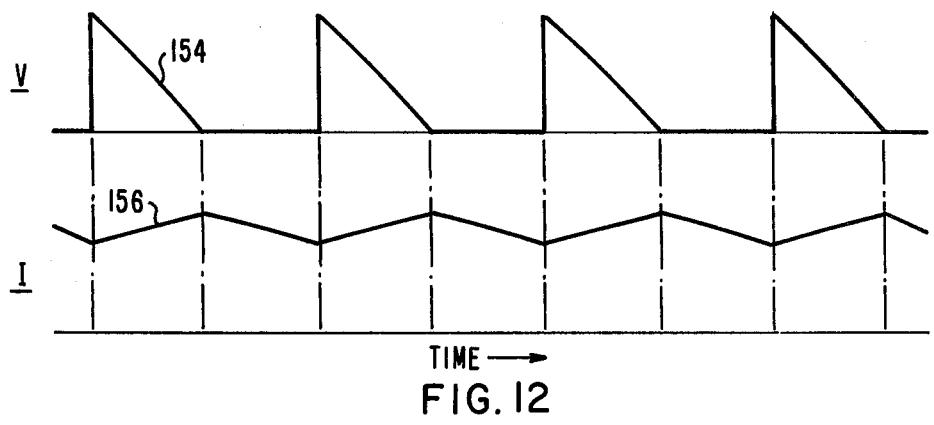
FIG. 12 illustrates a heavy load waveform in relation to the operation of the first voltage supply apparatus.

In FIG. 10 there is shown an equivalent circuit of the first voltage supply apparatus 24 and including a capacitor C4, a switch S and an inductor L4 feeding into a battery load. The capacitor C4 represents the charging capacitor 40 as modified by the turns ratio. The switch S represents the conducting thyristor 44 or 46. When this switch S is closed, a quarter sine wave of voltage is output for a light load condition as shown by the upper curve 150 in FIG. 11. The current shown by the curve 152 will rise to a maximum value and then free wheel down to zero through the diode FWD. For a heavy load condition, the output voltage waveform is shown by curve 154 in FIG. 12 and the current waveform is shown by curve 156, with the current increasing when the switch is closed and decreasing for current flow through the freewheeling diode FWD. The voltage curve width is caused by the inductor current of the choke. If the light load current comes to a stop each cycle then one actual application of the present invention had an 800 microsecond quarter cycle resonant frequency of the L4 and C4 equivalent transferred to the secondary by the transformer turns relationship. If the heavy load current of the L4 choke is continuous then the slope of the C4 voltage is $I/C = dv/dt$ and at high currents this time was about 300 microsecond. This variable width operation is provided by the phase controller with a zero time delay.

For one practical embodiment of the voltage converter apparatus in accordance with the present invention that was built and operated, the following component values were used:

Resistor 98: 4.22K ohm
Resistor 99: 5.1K ohm
Capacitor 100: 0.33 microfarad
Capacitor 101: 0.22 microfarad

I claim:

1. In signal converter apparatus operative with an input power source for energizing a first load and a second load, the combination of
   first switch means coupled with the input power source;
   first signal supply means including a transformer having a primary winding connected to the first switch means and a plurality of secondary windings, with one of the secondary windings energizing the first load with a first output signal;
   first control means operative with the first switch means and responsive to the first output signal for determining the actual voltage of the first output signal by controlling the frequency of the first output signal;
   second signal supply means including second switch means coupled with another of the secondary windings and energizing the second load with a second output signal having said frequency; and
   second control means operative with the second switch means and being responsive to a control signal determined by the first output signal and at least one of the current and voltage of the second output signal for determining the ON time phase relationship of the second switch means to control the second output signal.

2. The signal converter apparatus of claim 1, with the second switch means including thyristor rectifiers providing said ON time phase relationship as a pulse width regulation of the second output signal in response to the initiation of the first output signal supplied to the first load.

3. The signal converter apparatus of claim 1, with the first switch means regulating said actual voltage in response to the sensed voltage of the first output signal and with the second switch means regulating the actual voltage of the second output signal in response to the initiation of said control signal and in response to at least one of the sensed current and voltage of the second output signal.

4. The signal converter apparatus of claim 1, with said one secondary winding energizing the first load through a first rectifier providing said first output signal, and
   with the second control means being responsive to the provision of the first output signal to establish a predetermined time delay of the second output signal.

5. In voltage converter apparatus operative with an input voltage supply for energizing a first load and a second load, the combination of
   first thyristor switch means coupled with the input voltage supply;
   first rectifier and filter means connected through a first inductive coupling with the first thyristor switch means and providing an actual first output voltage to said first load;
   first conduction control means responsive to the actual first output voltage and controlling the operation of the first thyristor switch means to regulate the frequency of the actual first output voltage in accordance with a reference first output voltage;
   second rectifier and filter means connected through a second inductive coupling with the first thyristor switch means and providing an actual second output voltage to said second load; and
   second conduction control means responsive to the actual second output voltage and controlling the operation of the second rectifier and filter means to determine the provision time of the actual second output voltage in accordance with the provision time of the actual first output voltage.

6. In voltage converter apparatus operative with an input voltage supply for energizing a first load and a second load, the combination of
   first thyristor switch means coupled with the input voltage supply;
   first rectifier and filter means connected through a first inductive coupling with the first thyristor switch means and providing a first output voltage to said first load;
   first conduction control means responsive to the first output voltage and controlling the operation of the first thyristor switch means to regulate the actual first output voltage in accordance with a reference first output voltage;
   second rectifier and filter means connected through a second inductive coupling with the first thyristor switch means and providing a second output voltage to said second load; and
   second conduction control means responsive to the second output voltage and controlling the operation of the second rectifier and filter means to regulate the actual second output voltage in accordance with a reference second output voltage;
   with the second conduction control means being responsive to the frequency of the first output voltage for determining the frequency of the second output voltage.

7. In voltage converter apparatus operative with an input voltage supply for energizing a first load and a second load, the combination of
   first thyristor switch means coupled with the input voltage supply;
   first rectifier and filter means connected through a first inductive coupling with the first thyristor switch means and providing a first output voltage to said first load;

first conduction control means responsive to the first output voltage and controlling the operation of the first thyristor switch means to regulate the actual first output voltage in accordance with a reference first output voltage;

second rectifier and filter means connected through a second inductive coupling with the first thyristor switch means and providing a second output voltage to said second load; and second conduction control means responsive to the second output voltage and controlling the operation of the second rectifier and filter means to regulate the actual second output voltage in accordance with a reference second output voltage;

with the second rectifier and filter means including thyristor devices and the second conduction control means being responsive to the first output voltage to control the operational phase of the latter thyristor devices for regulating the actual second output voltage.

* * * * *